United States Patent
Ovard et al.

(10) Patent No.: US 6,356,764 B1
(45) Date of Patent: Mar. 12, 2002

(54) WIRELESS COMMUNICATION SYSTEMS, INTERROGATORS AND METHODS OF COMMUNICATING WITHIN A WIRELESS COMMUNICATION SYSTEM

(75) Inventors: David K. Ovard, Meridian; Roy Greeff, Boise, both of ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/265,074

(22) Filed: Mar. 9, 1999

(51) Int. Cl.[7] .................................................. H04Q 7/20
(52) U.S. Cl. ...................... 455/456; 455/458; 455/410; 455/11.1; 340/573.4
(58) Field of Search ................................ 455/456, 31.2, 455/458, 410, 11.1; 340/573.4, 988, 989, 991, 990, 992

(56) References Cited

U.S. PATENT DOCUMENTS

| | | |
|---|---|---|
| 4,075,632 A | 2/1978 | Baldwin et al. |
| 4,926,182 A | 5/1990 | Ohta et al. |
| 5,617,060 A | 4/1997 | Wilson et al. |
| 5,621,412 A | 4/1997 | Sharpe et al. |
| 5,649,296 A | 7/1997 | MacLellan et al. |
| 5,926,747 A * | 7/1999 | Komara et al. ............... 455/69 |
| 5,970,388 A * | 10/1999 | Will ........................... 455/31.2 |

* cited by examiner

*Primary Examiner*—Daniel Hunter
*Assistant Examiner*—Lana Le
(74) *Attorney, Agent, or Firm*—Wells, St. John P.S.

(57) ABSTRACT

The present invention relates to wireless communication systems, interrogators and methods of communicating within a wireless communication system. One aspect of the present invention provides a wireless communication system including at least one remote communication device configured to communicate a return link wireless signal; an interrogator including: a communication station configured to receive the return link wireless signal and to generate a return link communication signal corresponding to the return link wireless signal; communication circuitry coupled with the communication station and configured to communicate the return link communication signal; and a housing remotely located with respect to the communication station and including circuitry configured to receive the return link communication signal from the communication circuitry and to process the return link communication signal.

1 Claim, 7 Drawing Sheets

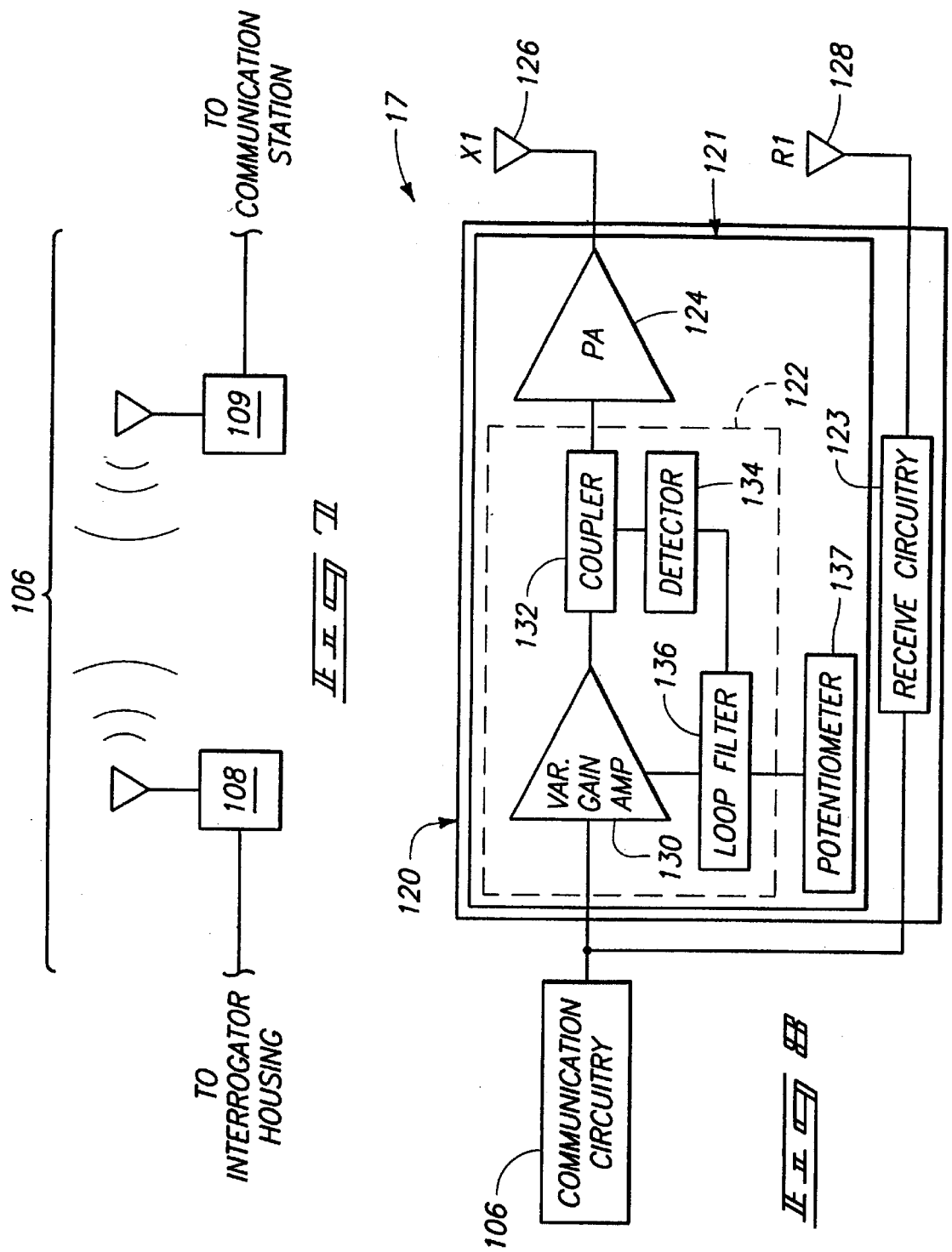

WIRELESS COMMUNICATION SYSTEMS, INTERROGATORS AND METHODS OF COMMUNICATING WITHIN A WIRELESS COMMUNICATION SYSTEM

TECHNICAL FIELD

The present invention relates to wireless communication systems, interrogators and methods of communicating within a wireless communication system.

BACKGROUND OF THE INVENTION

Electronic identification systems typically comprise two devices which are configured to communicate with one another. Preferred configurations of the electronic identification systems are operable to provide such communications via a wireless medium.

One such configuration is described in U.S. patent application Ser. No. 08/705,043, filed Aug. 29, 1996, assigned to the assignee of the present application, and incorporated herein by reference. This application discloses the use of a radio frequency (RF) communication system including communication devices. The disclosed communication devices include an interrogator and a remote transponder, such as a tag or card. Another example of a wireless communication system including a backscatter system is described in U.S. Pat. No. 5,649,296 to MacLellan et al. which is also incorporated herein by reference.

Such communication systems can be used in various applications such as identification applications. The interrogator is configured to output a polling or interrogation signal which may comprise a radio frequency signal including a predefined interrogation code using which the interrogator may address remote transponders. The remote transponders of such a communication system are operable to transmit an identification signal responsive to receiving an appropriate polling or interrogation signal.

More specifically, the appropriate transponders are configured to recognize the predefined code. The transponders receiving the code can subsequently output a particular identification signal which is associated with the transmitting transponder. Following transmission of the polling signal, the interrogator is configured to receive the identification signals enabling detection of the presence of corresponding transponders.

Such communication systems are useable in identification applications such as inventory or other object monitoring. For example, a remote identification device can be attached to an object of interest. Responsive to receiving the appropriate polling signal, the identification device is equipped to output an identification signal. Generating the identification signal identifies the presence or location of the identification device and the article or object attached thereto.

It may be desired to communicate with remote communication devices located at greater distances in particular applications. Such areas may exceed the range of the communication system. Typical conventional arrangements require the utilization of numerous interrogators for communication with the remote communication devices in such spaced areas. Alternatively, the movement of a single interrogator from one area to another is required.

SUMMARY OF THE INVENTION

The present invention provides wireless communication systems, interrogators and methods of communicating within a wireless communication system.

According to one aspect of the present invention, a wireless communication system comprises at least one remote communication device configured to communicate a return link wireless signal. The return link wireless signal comprises a radio frequency signal in certain aspects of the invention.

The wireless communication system in some embodiments includes an interrogator having a communication station, communication circuitry and a housing. The communication station is configured to receive the return link wireless signal and to generate a return link communication signal corresponding to the return link wireless signal. The communication circuitry is provided to couple with the communication station and to communicate the return link communication signal. The housing is remotely located with respect to the communication station and includes circuitry configured to receive the return link communication signal from the communication circuitry and to process the return link communication signal.

In one configuration, the housing includes automatic gain control circuitry configured to adjust the power level of the return link communication signals. Amplifiers can be provided within one or both of the interrogator housing and the communication station to increase the power level of the return link communication signals. Plural communication stations and plural communication circuits are coupled with a single interrogator housing in some embodiments.

BRIEF DESCRIPTION OF THE DRAWINGS

Preferred embodiments of the invention are described below with reference to the following accompanying drawings.

FIG. 7 is a functional block diagram of exemplary communication circuitry shown in FIG. 1.

FIG. 8 is a functional block diagram of exemplary transmit circuitry of a communication station shown in FIG. 1.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
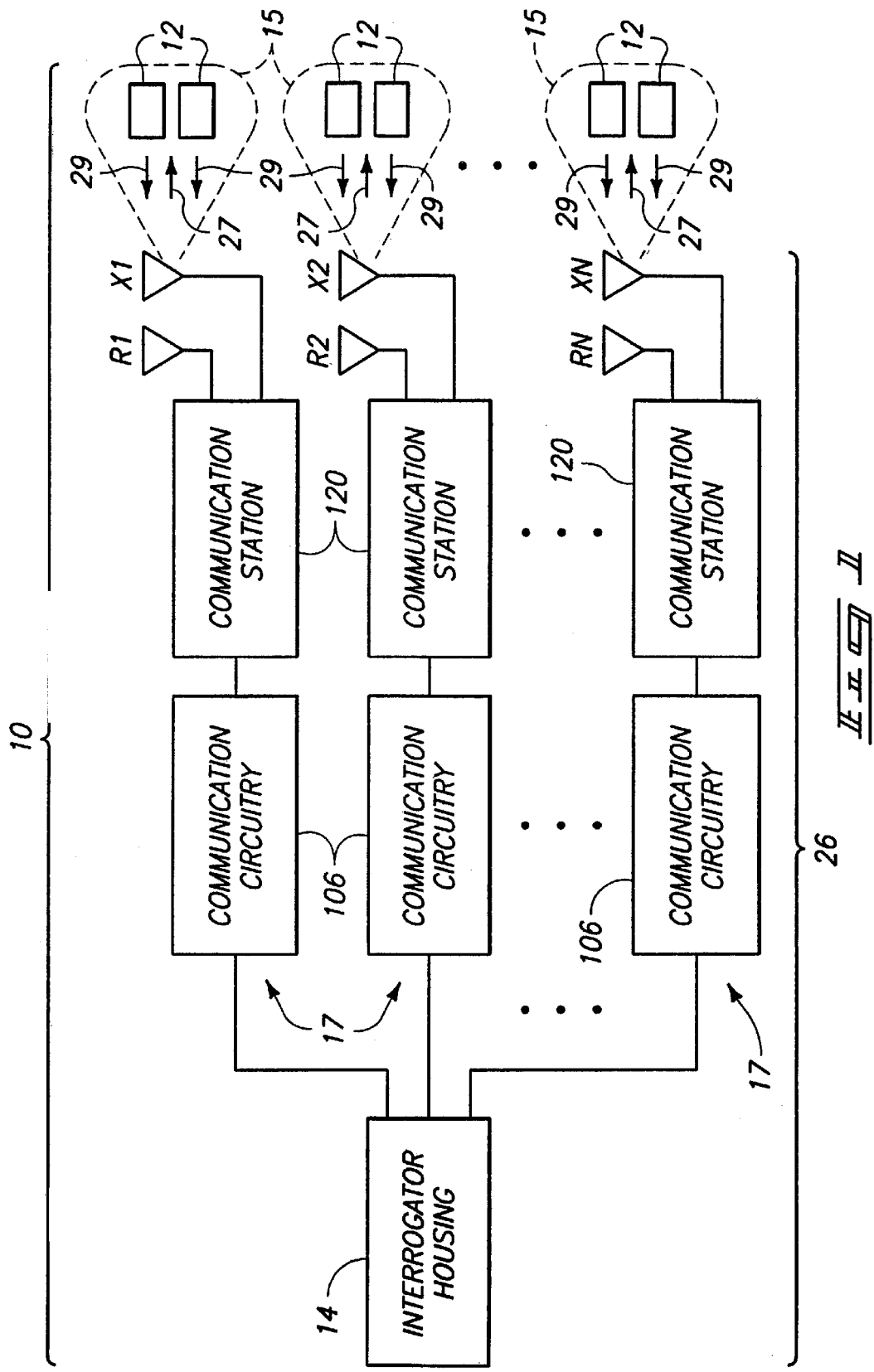
FIG. 1 is a block diagram of an exemplary communication system according to one embodiment of the present invention.

FIG. 1 illustrates a communication system 10 embodying the invention. Communication system 10 comprises an electronic identification system in the embodiment described herein. Communication system 10 may be configured for backscatter communications as described in detail below. Other communication protocols are utilized in other embodiments.

The depicted communication system 10 includes a plurality of remote communication devices 12 and an interrogator 26. Wireless (e.g., radio frequency) communications can occur intermediate remote communication devices 12 and interrogator 26 for use in identification systems and product monitoring systems as exemplary applications.

Remote communication devices 12 can include radio frequency identification devices (RFID) or remote intelligent communication (RIC) devices in the embodiments described herein. Exemplary remote communication devices 12 are disclosed in U.S. patent application Ser. No. 081705, 043. Plural remote communication devices 12 typically communicate with interrogator 26.

In one embodiment, remote communication devices 12 individually comprise a wireless identification device such as the MicroStamp (™) integrated circuit available from Micron Communications, Inc., 3176 S. Denver Way, Boise, Id. 83705. Such a remote communication device 12 can be referred to as a tag or card as illustrated and described below.

Remote communication devices 12 are configured to interface with interrogator 26 using a wireless medium in one embodiment. More specifically, communications intermediate remote communication devices 12 and interrogator 26 occur via an electromagnetic link, such as a radio frequency link in the described embodiment. Exemplary communications occur at microwave frequencies. Other configurations for communication are possible.

As described in detail below, interrogator 26 is configured to output forward link communications. Further, interrogator 26 is operable to receive reply or return link communications from remote communication devices 12 responsive to the outputting of forward link communications. In accordance with the above, forward link communications and return link communications comprise wireless signals, such as radio frequency signals, in the described embodiment. Other forms of electromagnetic communication, such as infrared, acoustic, etc., are possible.

The depicted configuration of communication system 10 illustrates interrogator 26 communicating with a plurality of remote communication devices 12 located in a plurality of corresponding communication ranges 15, also referred to as read zones. The depicted interrogator 26 includes a housing 14 coupled with a plurality of communication paths 17 individually positioned and configured to communicate with remote communication devices 12 located within corresponding communication ranges 15. Communication paths 17 individually include communication circuitry 106 and a corresponding communication station 120 in the described embodiment.

As described in detail below, housing 14 of interrogator 26 includes circuitry (not shown in FIG. 1) configured to generate a plurality of forward link communication signals. Such forward link communication signals are communicated within communication circuitry 106 of selected communication paths 17 to respective communication stations 120 having antennas X1, X2 . . . XN. Such communication stations 120 are configured to emit forward link wireless signals 27 which correspond to the forward link communication signals. In addition, communication stations 120 can individually emit a continuous wave signal during backscatter mode of operations of communication system 10. Further transmit operations of interrogator 26 are described in a copending U.S. patent application filed the same day as the present application, having the title "Wireless Communication Systems, Interrogators and Methods of Communicating Within a Wireless Communication System", assigned to assignee hereof, having attorney docket number MI40-179, naming David Ovard and Roy Greeff as inventors, and incorporated herein by reference.

As illustrated, communication stations 120 are preferably configured to radiate the forward link wireless signals 27 to associated remote communication devices 12 within respective communication ranges 15. Responsive to the reception of forward link wireless signals 27, individual remote communication devices 12 are operable to reply with return link wireless signals 29.

Communication stations 120 also include plural receive antennas R1, R2 . . . RN which are configured to receive return link wireless signals 29 from remote communication devices 12. Communication stations 120 of interrogator 26 preferably individually include receive circuitry configured to receive the return link wireless signals 29 and apply return link communication signals to interrogator housing 14 for processing as described in detail below. In particular, communication stations 120 generate return link communication signals corresponding to the received return link wireless signals. Communication circuits 106 communicate the return link communication signals to interrogator housing 14.

FIG. 1 is an illustrative representation of wireless communication system 10. More specifically, communication ranges 15 may be spread out over a relatively large geographic range. The wireless communication system 10 of the present invention provides the advantages of utilizing a single interrogator housing 14 and associated communication circuitry therein to communicate with remote communication devices 12 located in plural communication ranges 15.

Further, wireless communication system 10 of the present invention permits a single interrogator housing 14 and associated circuitry to service multiple communication ranges 15 which may be located several hundred feet apart or further, or in harsh environments. For example, one interrogator housing 14 can be utilized to service read zones or communication ranges 15 within spaced warehouses. Individual communication ranges 15 may be spaced from one another at distances which exceed the communication range of the devices. Additionally, adjacent communication ranges 15 may overlap in some applications.

As previously mentioned, individual communication paths 17 include communication circuits 106 and associated communication stations 120. Communication stations 120 are preferably positioned to communicate with respective communication ranges 15. Communication circuits 106 are configured in the depicted arrangement to communicate forward link communication signals from interrogator housing 14 to corresponding communication stations 120. Communication circuits 106 are also configured to communicate return link communication signals received within corresponding communication stations 120 to interrogator housing 14.

In the described embodiment, communication circuits 106 are located outside of interrogator housing 14. In addition, communication stations 120 are remotely located with respect to interrogator housing 14. Communication stations 120 are individually configured to receive forward link communication signals from interrogator housing 14 via communication circuitry 106 and radiate forward link wireless signals 27 corresponding to the forward link communications signals using associated antennas X1, X2 . . . XN.

Further, communication stations 120 are individually configured to receive return link wireless signals 29 from remote communication devices 12 using associated antennas designated R1, R2 . . . RN. Communication stations 120 output return link communication signals corresponding to the return link wireless signals 29 to interrogator housing 14 using respective communication circuits 106.

Individual ones of communication stations 120 may be located at varying distances from interrogator housing 14 depending upon a particular application. Interrogator housing 14, communication circuits 106 and communication stations 120 are configured to communicate the forward link communication signals and return link communication signals intermediate interrogator housing 14 and respective communication stations 120 regardless of the varying distances.

Remote communication devices 12 are individually configured for wireless communications in one embodiment as described in detail below. Such remote communication devices 12 receive the forward link wireless signals 27 and respond with the return link wireless signals 29 which are received within communication stations 120.

In one embodiment, return link wireless signals 29 are encoded with information that uniquely identifies or labels the particular device 12 that is transmitting so as to identify any object, animal or person with which communication device 12 is associated. More specifically, remote devices 12 are configured to output an identification signal within return link wireless signals 29 responsive to receiving forward link wireless signals 27. Interrogator 26 is configured to receive and recognize the identification signal within the return or return link communications 29. The identification signal can be utilized to identify the particular transmitting remote communication device 12.

Figure 2:
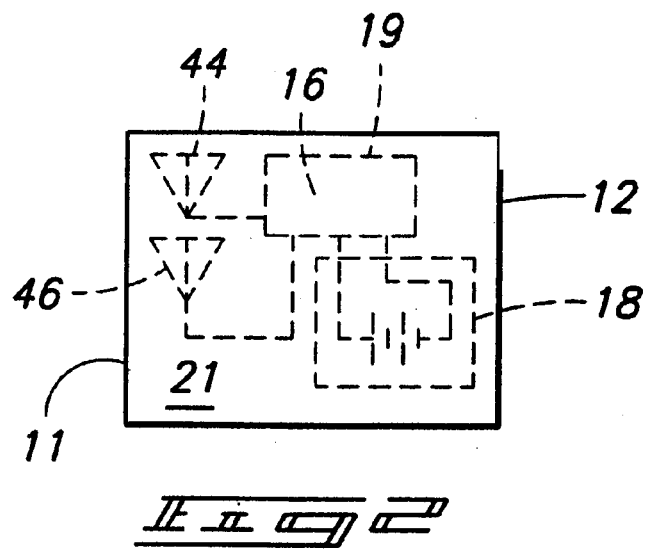
FIG. 2 is a front view of a wireless remote communication device according to one embodiment of the invention.

Referring to FIG. 2, one embodiment of a remote communication device 12 is illustrated. The depicted communication device 12 includes a transponder 16 having a receiver and a transmitter as described below. Communication device 12 further includes a power source 18 connected to transponder 16 to supply operational power to transponder 16. In the illustrated embodiment, transponder 16 is in the form of an integrated circuit 19. However, in alternative embodiments, all of the circuitry of transponder 16 is not necessarily included in integrated circuit 19.

Power source 18 is a thin film battery in the illustrated embodiment, however, in alternative embodiments, other forms of power sources can be employed. If the power source 18 is a battery, the battery can take any suitable form. Preferably, the battery type will be selected depending on weight, size and life requirements for a particular application. In one embodiment, battery 18 is a thin profile button-type cell forming a small, thin energy cell more commonly utilized in watches and small electronic devices requiring a thin profile. A conventional button-type cell has a pair of electrodes, an anode formed by one face and a cathode formed by an opposite face. In an alternative embodiment, the battery comprises a series connected pair of button type cells.

Communication device 12 further includes at least one antenna connected to transponder 16 for wireless transmission and reception. In the illustrated embodiment, communication device 12 includes at least one receive antenna 44 connected to transponder 16 for radio frequency reception by transponder 16, and at least one transmit antenna 46 connected to transponder 16 for radio frequency transmission by transponder 16. The described receive antenna 44 comprises a loop antenna and the transmit antenna 46 comprises a dipole antenna.

Remote communication device 12 can be included in any appropriate housing or packaging. FIG. 2 shows but one example of a housing in the form of a miniature housing 11 encasing device 12 to define a tag which can be supported by an object (e.g., hung from an object, affixed to an object, etc.).

Figure 3:
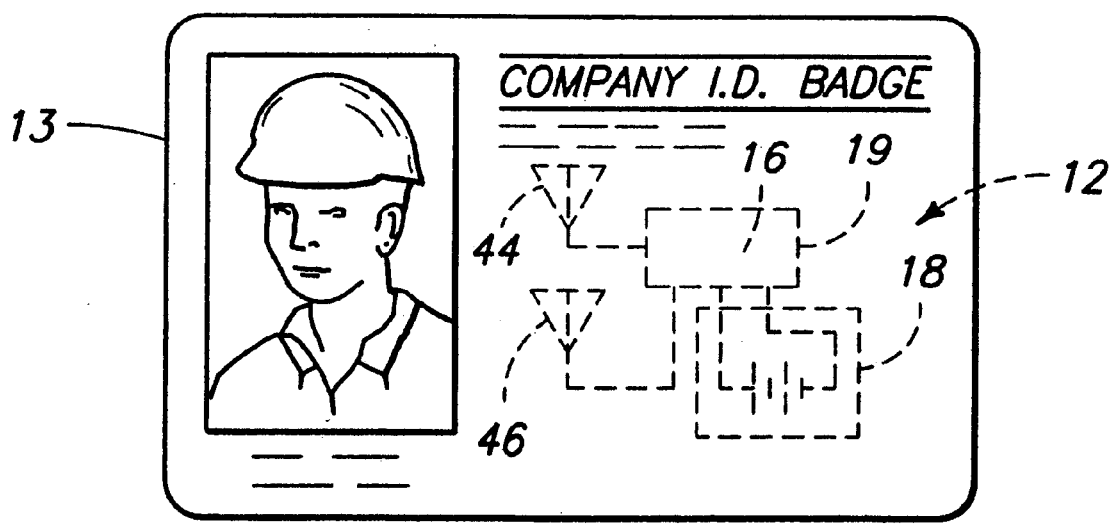
FIG. 3 is a front view of an employee badge according to another embodiment of the invention.

Referring to FIG. 3, an alternative housing is illustrated. FIG. 3 shows a housing in the form of a card 13. Card 13 preferably comprises plastic or other suitable material. Plastic card 13 houses communication device 12 to define an employee identification badge including the communication device 12. In one embodiment, the front face of card 13 has visual identification features such as an employee photograph or a fingerprint in addition to identifying text.

Although two particular types of housings have been disclosed, the communication device 12 can be included in any appropriate housing. Communication device 12 is preferably of a small size that lends itself to applications employing small housings, such as cards, miniature tags, etc. Larger housings can also be employed. The communication device 12, provided in any appropriate housing, can be supported from or attached to an object in any desired manner.

Figure 4:
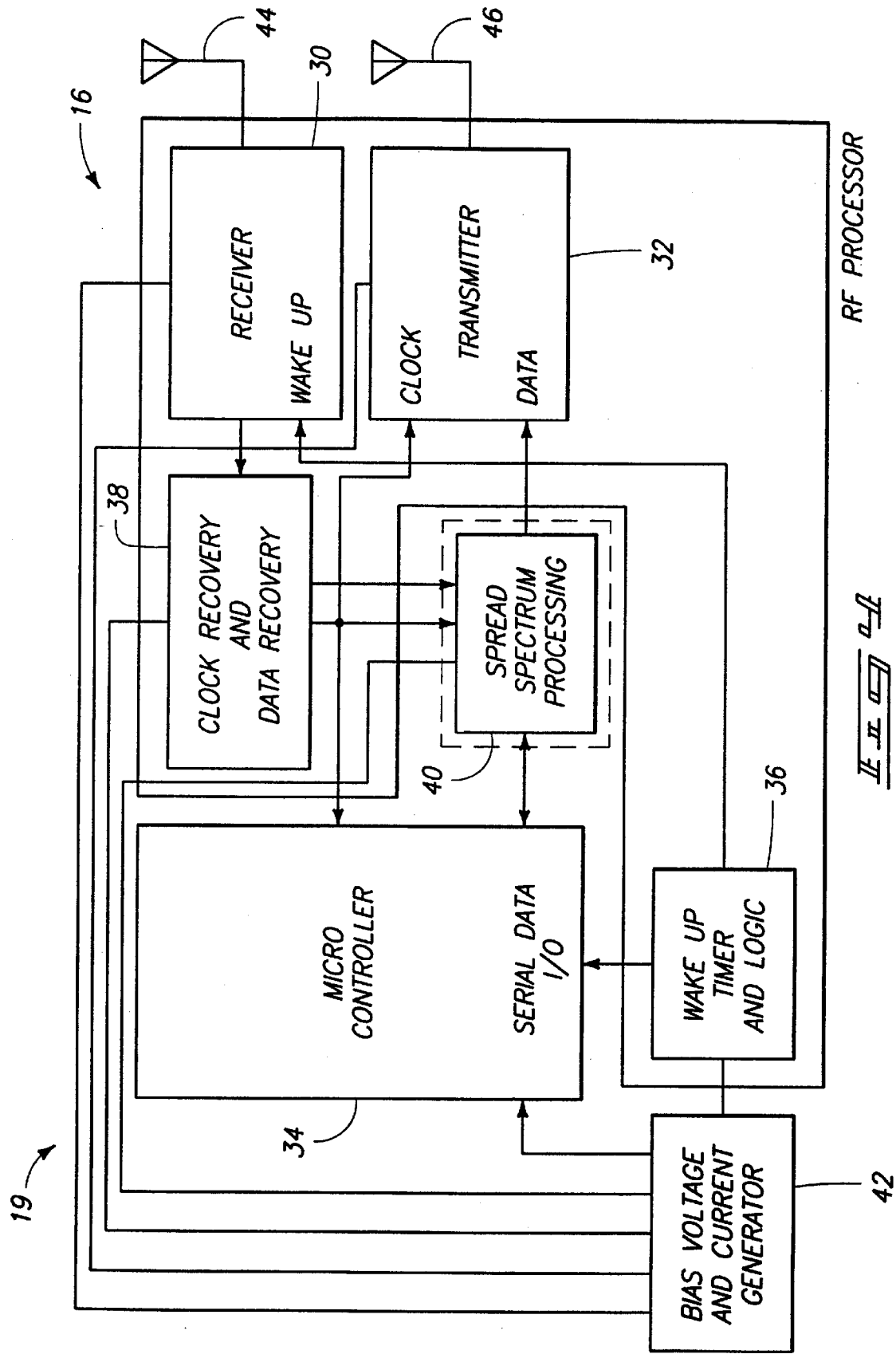
FIG. 4 is a functional block diagram of a transponder included in the remote communication device of FIG. 2.

FIG. 4 is a high level circuit schematic of an embodiment of transponder 16 utilized in remote communication devices 12. In the embodiment shown in FIG. 4, transponder 16 is implemented within a monolithic integrated circuit 19. In the illustrated embodiment, integrated circuit 19 comprises a single die, having a size of 209×116 mils$^2$, including a receiver 30, a transmitter 32, a microcontroller or microprocessor 34, a wake up timer and logic circuit 36, a clock recovery and data recovery circuit 38, and a bias voltage and current generator 42. Integrated circuit 19 preferably comprises a small outline integrated circuit (SOIC) package. Receiver 30 and transmitter 32 comprise wireless communication circuitry configured to communicate wireless signals.

In one embodiment, communication devices 12 switch between a "sleep" mode of operation, and higher power modes to conserve energy and extend battery life during periods of time where no interrogation signal 27 is received by devices 12, using the wake up timer and logic circuitry 36.

In one embodiment, a spread spectrum processing circuit 40 is included in transponder 16. In this embodiment, signals transmitted and received by interrogator 26 and signals transmitted and received by communication device 12 are modulated spread spectrum signals. Many modulation techniques minimize required transmission bandwidth. However, the spread spectrum modulation techniques employed in the illustrated embodiment require a transmission bandwidth that is up to several orders of magnitude greater than the minimum required signal bandwidth. Although spread spectrum modulation techniques are bandwidth inefficient in single user applications, they are advantageous where there are multiple users, as is the case with the preferred radio frequency identification communication system 10 of the present invention.

The spread spectrum modulation technique of the illustrated embodiment is advantageous because the interrogator signal can be distinguished from other signals (e.g., radar, microwave ovens, etc.) operating at the same frequency. The spread spectrum signals transmitted by communication device 12 and interrogator 26 are pseudo random and have noise-like properties when compared with the digital command or reply. The illustrated embodiment employs direct sequence spread spectrum (DSSS) modulation.

In operation, interrogator 26 sends out a command that is spread around a certain center frequency (e.g, 2.44 GHz). After the interrogator transmits the command, and is expecting a response, the interrogator switches to a continuous wave (CW) mode for backscatter communications. In the continuous wave mode, interrogator 26 does not transmit any information. Instead, the interrogator just transmits a radio frequency continuous wave signal. In the described embodiment, the continuous wave signal comprises a radio frequency 2.44 GHz carrier signal. In other words, the continuous wave signal transmitted by interrogator 26 is not modulated. After communication device 12 receives the forward link communication from interrogator 26, communication device 12 processes the command.

If communication device 12 is operating in a backscatter mode, device 12 modulates the continuous wave signal providing a modulated continuous wave signal to communicate return link communication 29 responsive to reception of forward communication signal 27. Communication device 12 may modulate the continuous wave signal according to a subcarrier or modulation signal. Modulation by device 12 comprises selective reflection of the continuous wave signal. In particular, device 12 alternately reflects or does not reflect the continuous wave signal from the interrogator to send its reply. For example, in the illustrated embodiment, two halves of a dipole antenna are either shorted together or isolated from each other to send a reply. Alternatively, communication device 12 can communicate in an active mode.

The modulated continuous wave signal communicated from device 12 comprises a carrier component and plural side band components about the carrier component resulting from the modulation. More specifically, the modulated continuous wave signal output from device 12 includes a radio frequency continuous wave signal having a first frequency (2.44 GHz), also referred to as a carrier component, and a subcarrier modulation signal having a different frequency (e.g., 600 kHz) which provides the side band components. In particular, the side band components are at +/−600 kHz of the carrier component.

In one embodiment, the clock for transponder 16 is extracted from the incoming message itself by clock recovery and data recovery circuitry 38. This clock is recovered from the incoming message and used for timing for microcontroller 34 and all the other clock circuitry on the chip and also for deriving the transmitter carrier or the subcarrier, depending on whether the transmitter is operating in active mode or backscatter mode.

In addition to recovering a clock, the clock recovery and data recovery circuit 38 also performs data recovery on valid incoming signals. The valid spread spectrum incoming signal is passed through the spread spectrum processing circuit 40 which extracts the actual ones and zeros of data from the incoming signal. More particularly, the spread spectrum processing circuit 40 takes chips from the spread spectrum signal and reduces individual thirty-one chip sections down to a bit of one or zero, which is passed to microcontroller 34.

Microcontroller 34 includes a serial processor, or I/O, facility that receives the bits from spread spectrum processing circuit 40. The microcontroller 34 performs further error correction. More particularly, a modified hamming code is employed, wherein each eight bits of data is accompanied by five check bits used by the microcontroller 34 for error correction. Microcontroller 34 further includes a memory, and after performing the data correction, microcontroller 34 stores bytes of the data bits in memory. These bytes contain a command sent by the interrogator 26. Microcontroller 34 is configured to respond to the command.

For example, interrogator 26 may send a command requesting that any communication device 12 in the field respond with the device's identification number. Status information can also be returned to interrogator 26 from remote communication devices 12. Additionally, remote communication devices 12 may be individually coupled with a peripheral device and information regarding the peripheral device may also be communicated.

Communications from interrogator 26 (i.e., forward link communications) and devices 12 (i.e., return link communications) have a similar format. More particularly, the forward and return communications individually include a calibration period, preamble and Barker or start code which are followed by actual data in the described embodiment. The incoming forward link message and outgoing return preferably also include a check sum or redundancy code so that transponder 16 or interrogator 26 can confirm receipt of the entire forward message or return message.

Communication devices 12 typically include an identification sequence identifying the particular tag or device 12 sending the return link signal. Such implements the identification operations of communication system 10.

After sending a command, interrogator 26 sends the unmodulated continuous wave signal. Return link data can be Differential Phase Shift Key (DPSK) modulated onto the continuous wave signal using a square wave subcarrier with a frequency of approximately 600 kHz (e.g., 596.1 kHz in one embodiment). A data 0 corresponds to one phase and data 1 corresponds to another, shifted 180 degrees from the first phase.

The subcarrier or modulation signal is used to modulate antenna impedance of transponder 16 and generate the modulated continuous wave signal. For a simple dipole, a switch between the two halves of the dipole antenna is opened and closed. When the switch is closed, the antenna becomes the electrical equivalent of a single half-wavelength antenna that reflects a portion of the power being transmitted by the interrogator. When the switch is open, the antenna becomes the electrical equivalent of two quarter-wavelength antennas that reflect very little of the power transmitted by the interrogator. In one embodiment, the dipole antenna is a printed microstrip half-wavelength dipole antenna.

Figure 5:
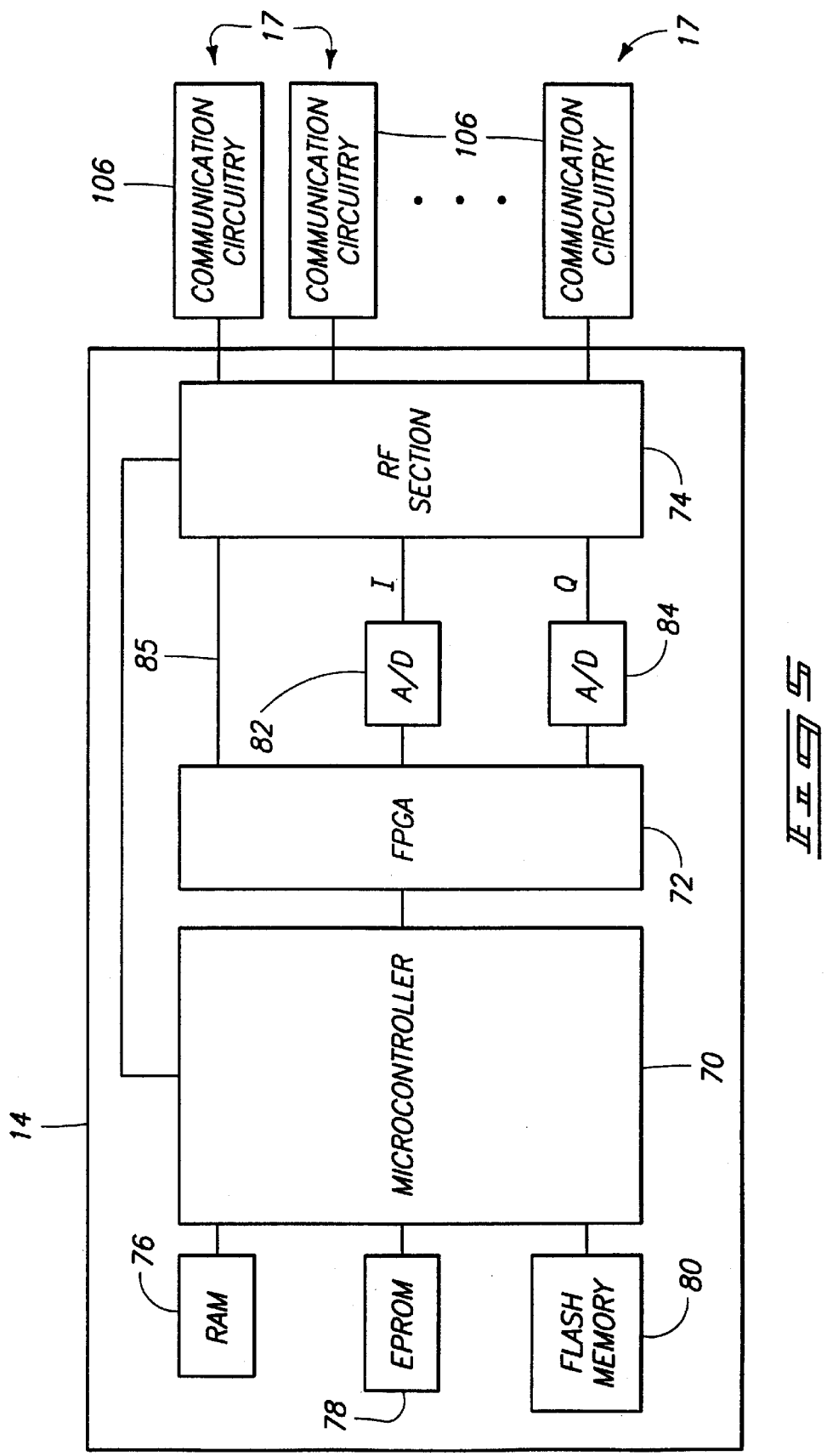
FIG. 5 is a functional block diagram of one embodiment of a portion of an interrogator of the invention.

Referring to FIG. 5, one embodiment of interrogator housing 14 and the internal circuitry therein is illustrated. The depicted interrogator housing 14 generally includes a microcontroller 70, a field programmable gate array (FPGA) 72 and RF section 74. In the depicted embodiment, microcontroller 70 comprises a MC68340 microcontroller available from Motorola, Inc. FPGA 72 comprises an XC4028 device available from Xilinx, Inc. Further details of components 70, 72 and 74 are described below.

Interrogator housing 14 also includes RAM 76, EPROM 78 and flash memory 80 coupled with microcontroller 70 in the depicted embodiment. Microcontroller 70 is configured to access an applications program from EPROM 78 for controlling the interrogator 26 and interpreting responses from remote communication devices 12.

The processor of microcontroller 70 is configured to control communication operations with remote communication devices 12 during normal modes of operation. The applications program can also include a library of radio frequency identification device applications or functions. These functions effect radio frequency communications between interrogator 26 and associated remote communication devices 12.

Microcontroller 70 includes circuitry configured to generate forward link communication signals to be communicated to remote communication devices 12. Further, microcontroller 70 is also configured to process return link communication signals received from remote communication devices 12. Alternatively, an external processor or computer (not shown can be coupled with interrogator 26 to process the return link communication signals.

RF section 74 is configured to implement wireless (e.g., radio frequency) communications with remote communication devices 12. DPSK modulation techniques can be utilized for communications intermediate devices 12 and interrogator 26. RF section 74 can include downconversion circuitry for generating in-phase (I) and quadrature (Q) signals which contain the DPSK modulated subcarrier for application to FPGA 72 during return link communications.

Analog to digital (A/D) converters 82, 84 provide received analog RF signals into a digital format for application to FPGA 72. In particular, analog to digital converters 82, 84 are implemented intermediate FPGA 72 and RF section 74 for both in-phase (I) and quadrature (Q) communication lines.

An additional connection 85 is provided intermediate FPGA 72 and RF section 74 for forward link communication signals. Digital signals to be communicated from interrogator 26 are outputted from FPGA 72 via connection 85 and converted to RF forward link communication signals by RF section 74. Connection 85 can additionally be utilized to transmit phase lock loop (PLL) information and other necessary communication information. During forward link communications, FPGA 72 is configured to provide communication packets received from microcontroller 70 into a proper format for application to RF section 74 for communication.

FPGA 72 is configured to demodulate return link communications received from remote communication devices 12 via RF section 74. FPGA 72 is configured in the described embodiment to perform I and Q combination operations during receive operations. The described FPGA 74 further includes delay and multiplication circuitry to remove the subcarrier. FPGA 74 can also include bit synchronization circuitry and lock detection circuitry. Data, clock and lock detection signals generated within FPGA 74 are applied to microcontroller 70 for processing in the described embodiment.

Microcontroller 70 is configured to control operations of interrogator 26 including outputting of forward link communications and receiving return link communications. EPROM 78 is configured to store original applications program codes and settings selected for the particular application of communication system 10. Flash memory 80 is configured to receive software code updates which may be forwarded to interrogator 26.

RAM device 76 is configured to store data during operations of communication system 10. Such data can include information regarding communications with associated remote communication devices 12 and status information of interrogator 26 during normal modes of operation.

In accordance with the described embodiment, RF section 74 of interrogator housing 14 is coupled with plural communication circuits 106 as shown in FIG. 1. Microcontroller 70 is configured to select an appropriate communication circuit 106 to implement forward link and return link communications with desired remote communication devices 12 within respective communication ranges 15. RF section 74 includes switching circuitry configured to selectively couple one of communication circuits 106 with RF circuitry within RF section 74 as well as connection 85 and analog to digital converters 82, 84. Such switching is controlled by microcontroller 70 depending upon the individual communication range 15 presently communicating with interrogator 26.

For example, microcontroller 70 can initially select one of communication paths 17 to provide communications of interrogator 26 with remote communication devices 12 within the communication range 15 which corresponds to the originally selected path 17. Thereafter, microcontroller 70 can select another one of communication paths 17 using switching circuitry of RF section 74 to provide communications of interrogator 26 with remote communication devices 12 within the communication range 15 which corresponds to the newly selected path 17.

Exemplary switching operations of the communication paths 17 can be performed under control of microcontroller 70 after individual forward link communications to respective communication paths 17 and corresponding communication ranges 15 occur in one operational mode. Alternatively, microcontroller 70 can switch communication paths 17 after forward link communications and return link communications occur with a desired communication range 15. Other communication switching protocols can be utilized in other configurations.

Figure 6:
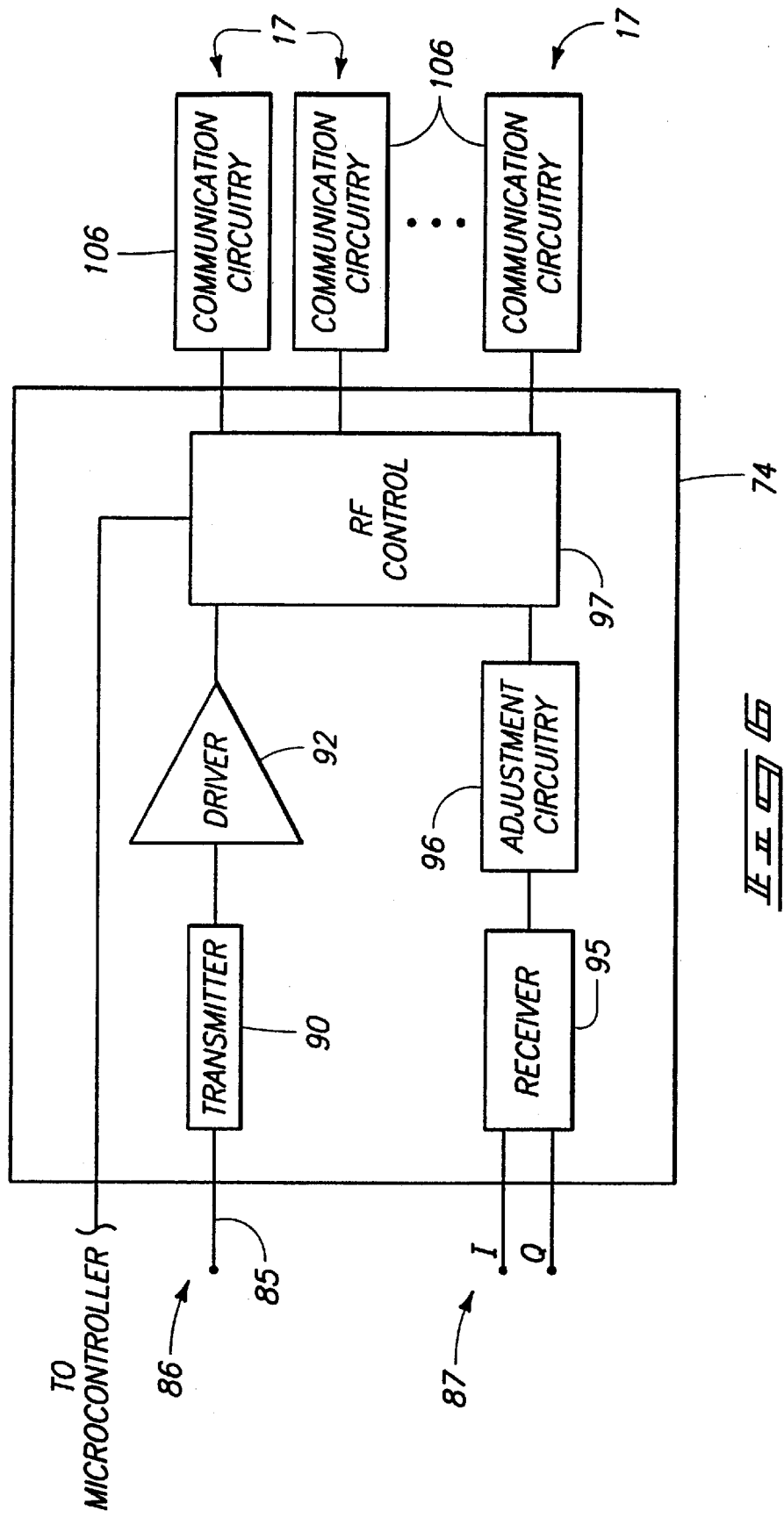
FIG. 6 is a functional block diagram of one embodiment of an RF section of the interrogator of FIG. 5.

Referring to FIG. 6, an exemplary configuration of RF circuitry 74 is illustrated. The depicted RF circuitry 74 includes a transmit path 86 and a receive path 87. Communication paths 86, 87 are coupled with RF control circuitry 97. Transmit path 86 is additionally coupled with FPGA 72 shown in FIG. 5 via connection 85. Receive path 87 is coupled with analog to digital converters 82, 84 shown in FIG. 5 via the I and Q connection lines.

Forward link communication signals are communicated via path 86 while return link communication signals are communicated via path 87. In the depicted embodiment, RF section 74 additionally includes a transmitter 90 and driver amplifier 92 within transmit data path 86. Receive path 87 includes a receiver 95 and adjustment circuitry 96 in the described embodiment.

Transmitter 90 is configured to implement radio frequency modulation operations in the described embodiment using the forward link communication signal previously generated. The modulated forward link communication signal outputted from transmitter 90 is applied to driver amplifier 92. Driver amplifier 92 is configured to increase the power level of the forward link communication signal. In typical implementations, driver amplifier 92 is configured to provide a gain of approximately 10–15 dB. Amplifiers providing more or less gain may be utilized depending upon the specific application and expected loss within communication circuitry 106.

Thereafter, driver amplifier 92 applies the amplified forward link communication signal to an input of a selected communication circuit 106 responsive to control from microcontroller 70 and using RF control 97. In the described configuration, RF control 97 comprises switching circuitry configured to selectively couple transmit path 86 and receive path 87 with a selected one (or ones) of communication circuitry 106. RF control 97 implements the switching operations to selectively couple communication circuits 106 with transmit path 86 and receive path 87 responsive to control from microcontroller 70.

Depending upon the particular application for use of communication system 10 or location of associated communication stations 120, communication circuits 106 can be individually implemented in one of a variety of configurations. Communication circuits 106 are located outside of interrogator housing 14 and are coupled with driver amplifier 92 and adjustment circuitry 96 via RF control 97. Communication circuits 106 are individually configured to communicate the forward link communication signals and return link communication signals within the corresponding communication path 17 intermediate housing 14 and the corresponding communication station 120.

In some embodiments, communication circuits 106 individually comprise coaxial RF cable. Depending upon the distance intermediate housing 14 and the corresponding communication station 120, low-loss coaxial RF cable may be utilized. Further, amplifiers having increased gain may be utilized in addition to the described amplifiers to increase the power level of the forward link communication signals and return link communication signals being communicated within communication circuitry 106. Various combinations of components can be utilized depending upon the particular application and associated loss to ensure that the forward link communication signals and return link communication signals outputted from communication circuitry 106 are at a power level sufficiently above the thermal noise.

Referring to FIG. 7, an alternative configuration of communication circuitry 106 which may be utilized within individual communication paths 17 is illustrated. The depicted communication circuitry 106 includes a plurality of transceivers 108, 109 individually coupled with one of interrogator housing 14 and one of communication stations 120. Transceivers 108, 109 operate to communicate forward link communication signals and return link communication signals intermediate interrogator housing 14 and the corresponding communication station 120. In an exemplary configuration, transceivers 108, 109 are configured to communicate utilizing electromagnetic signals, such as radio frequency signals. Such signals are preferably communicated outside of the frequency band of forward link wireless signals 27 and return link wireless signals 29.

Referring to FIG. 8, an exemplary embodiment of one of communication stations 120 is illustrated. The depicted communication station 120 is coupled with communication circuitry 106. The depicted communication station 120 includes transmit circuitry 121 and receive circuitry 123. Transmit circuitry 121 is coupled with the X1 antenna 126 and receive circuity 123 is coupled with the R1 antenna 128. One configuration of transmit circuitry 121 is described with reference to FIG. 8, and one configuration of receive circuitry 123 is described with reference to FIG. 9.

The depicted transmit circuitry 121 shown in FIG. 8 includes adjustment circuitry 122, a power amplifier 124 and a potentiometer 137. Forward link communication signals received from communication circuitry 106 are applied to transmit circuitry 121. Forward link wireless signals 27 corresponding to the forward link communication signals are radiated using antenna 126. Return link wireless signals 29 are received by R1 antenna 128 and applied to receive circuitry 123. Receive circuitry 123 outputs return link communication signals corresponding to the return link wireless signals to communication circuitry 106.

Referring to transmit operations, forward link communication signals from communication circuitry 106 are initially applied to adjustment circuitry 122 within transmit circuitry 121. Adjustment circuitry 122 is configured to receive the forward link communication signals from communication circuitry 106 and to adjust at least one electrical characteristic of the forward link communication signals. In an exemplary configuration, adjustment circuitry 120 is configured to adjust the power level of the forward link communication signal.

More specifically, the depicted adjustment circuitry 122 comprises automatic gain control (AGC) circuitry. In particular, the automatic gain control circuitry is configured to monitor the power of the forward link communication signals, compare the power with a predetermined threshold value and adjust the power of the forward link communication signals responsive to the comparison.

Adjustment circuitry 122 comprising automatic gain control circuitry includes a variable gain amplifier 130, a coupler 132, a detector 134 and a loop filter 136 in an exemplary configuration. Forward link communication signals received from communication circuitry 106 are applied to coupler 132. Coupler 132 directs a portion of the power of the forward link communication signals to detector 134 which converts the received power into a voltage.

The converted voltage is directed to loop filter 136. Loop filter 136 is additionally coupled with a potentiometer 137 in the described configuration. Potentiometer 137 can be utilized to provide an adjustable threshold reference voltage. Potentiometer 137T may be varied to fine tune individual communication stations 120 depending upon the distance intermediate the communication station 120 and interrogator housing 14 (e.g., the threshold reference voltage can be varied to accommodate varying amounts of loss intermediate individual communication stations 120 and the corresponding interrogator housing 14).

A Loop filter 136 compares the received voltage from detector 134 representing the power level of the received forward link communication signals with the adjustable reference voltage determined by potentiometer 137. Thereafter, loop filter 136 outputs a control signal to variable gain amplifier 130 to adjust the power of the forward link communication signals applied to power amplifier 124 responsive to the comparison.

Preferably, variable gain amplifier 130 provides forward link communication signals to power amplifier 124 which have a substantially constant input power level as determined by potentiometer 137. Such is preferred to provide linear operation of power amplifier 124. Power amplifier 124 amplifies the forward link communication signals. It is preferred to provide forward link communication signals of approximately 1 mW to power amplifier 124 which comprises a 1 watt amplifier in one embodiment operable to provide approximately 30 dB of gain.

The output of power amplifier 124 is applied to the X1 antenna 126. Preferably, the distance intermediate power amplifier 124 and the X1 antenna 126 is minimized. X1 antenna 126 is operable to receive the amplified forward link communication signals 27 from power amplifier 124 and to radiate forward link wireless signals 27 corresponding to the forward link communication signals. X1 antenna 126 of the corresponding communication station 120 is preferably positioned to radiate the forward link wireless signals 27 within at least one of the plurality of communication ranges 15.

Figure 9:
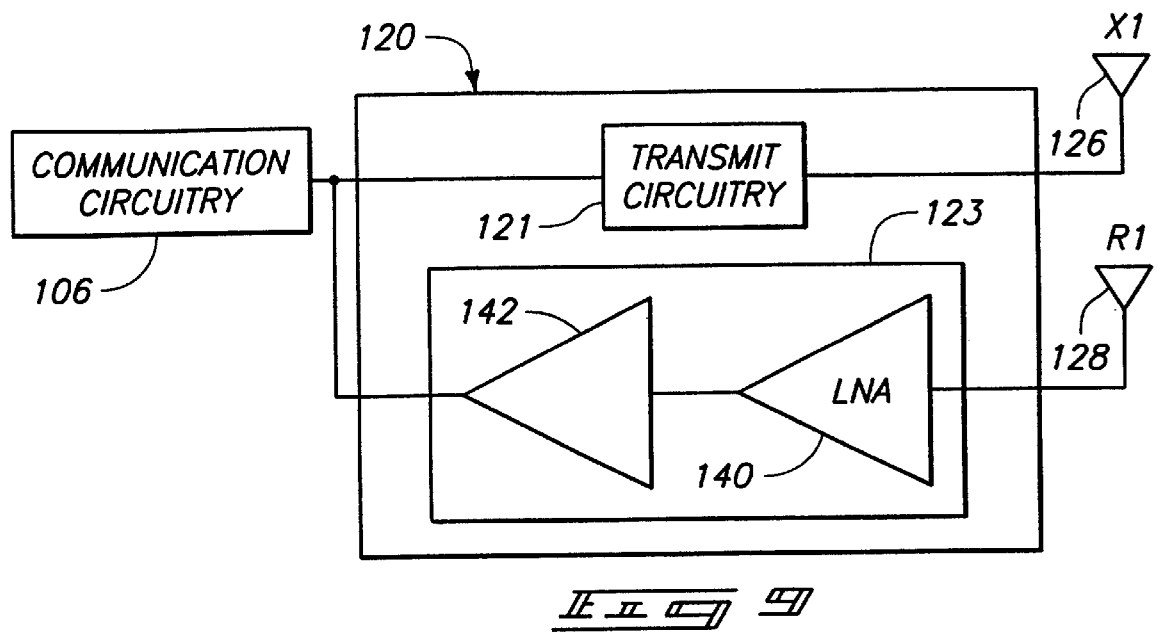
FIG. 9 is a functional block diagram of exemplary receive circuitry of the communication station shown in FIG. 1.

Referring to FIG. 9, details of receive circuitry 123 are illustrated. Receive circuitry 123 is coupled with communication circuitry 106 and R1 antenna 128. The illustrated receive circuitry 123 includes a low noise amplifier (LNA) 140 coupled with an amplifier 142. The R1 antenna 128 is coupled with low noise amplifier 140. R1 antenna 128 receives return link wireless signals 29 from remote communication devices 12 located within one or more of communication ranges 15. Antenna 128 outputs return link communication signals corresponding to the return link wireless signals 29 to low noise amplifier 140.

Preferably, the distance intermediate the R1 antenna 128 and the low noise amplifier 140 is minimized. The low noise amplifier 140 is configured to receive the return link communication signals and increase the power of the return link communication signals. Such amplification preferably increases the level of the return link communication signals to a sufficient degree above the thermal noise.

The return link communication signals are thereafter applied to 41 amplifier 142 which has a gain to further increase the power level of the return link communication signals. In an exemplary configuration, amplifiers 140, 142 individually have a gain of approximately 15 dB. Receive circuitry 123 is merely exemplary and can be configured to provide more or less gain depending upon the expected loss within communication circuitry 106. In one configuration, amplifier 142 also comprises a low noise amplifier.

Preferably, receive circuitry 123 and communication circuitry 106 are configured to provide return link communication signals to the interrogator housing 14 having a sufficient signal-to-noise ratio. As previously described, communication circuitry 106 comprising coaxial RF cable, transceivers or other configurations communicates the return link communication signals to interrogator housing 14.

Figure 10:
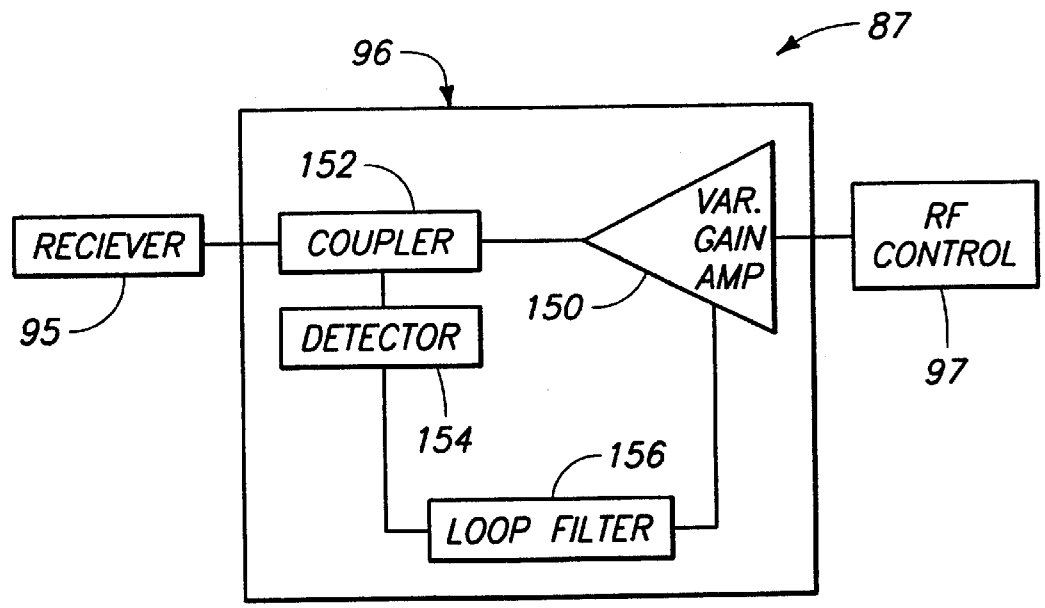
FIG. 10 is a functional block diagram of exemplary adjustment circuitry within a housing of the interrogator.

Referring to FIG. 10, return link communication signals received within communication station 120 and communicated using communication circuitry 106 are applied to RF control 97 within interrogator housing 14. RF control 97 operates to selectively couple one of communication circuits 106 with receive path 87 responsive to control from microcontroller 70 as described above.

Return link communication signals from RF control 97 are applied to adjustment circuitry 96 within housing 14. Adjustment circuitry 96 is configured to receive the return link communication signals from RF control 97 and to adjust at least one electrical characteristic of the return link communication signals. In an exemplary configuration, adjustment circuitry 96 is configured to adjust the power level of the return link communication signals.

More specifically, the depicted adjustment circuitry 96 comprises automatic gain control (AGC) circuitry. The automatic gain control circuitry is configured to monitor the power of the return link communication signals, compare the power with a threshold value and adjust the power of the return link communication signals responsive to the comparison.

Adjustment circuitry 96 comprising automatic gain control circuitry includes a variable gain amplifier 150, a coupler 152, a detector 154 and a loop filter 156. Return link communication signals received from RF control 97 are applied to variable gain amplifier 150 which adjusts the power level of the return link communication signals responsive to control from loop filter 156. Coupler 152 directs a portion of the power of the return link communication signals to detector 154 which converts the received power into a voltage. The converted voltage is directed to loop filter 156.

Loop filter 156 compares the received voltage from detector 154 representing the power level of the return link communication signals with a reference voltage. Thereafter, loop filter 156 outputs a control signal to variable gain amplifier 150 which adjusts the power of the return link communication signals applied to receiver 95 responsive to the comparison. Although not shown, circuitry may be provided to permit adjustment of the reference voltage of loop filter 156 similar to that of potentiometer 137 of communication station 120.

Preferably, variable gain amplifier 150 provides return link communication signals to receiver 95 which have a substantially constant or fixed input level. In one embodiment, adjustment circuitry 96 is configured to output rerun link communication signals having a power level of approximately 3 dBm. Such is preferred to avoid saturation of components (e.g., downconversion circuitry) within receiver 95. The return link communication signals may be processed by microcontroller 70 or other circuitry following demodulation of the return link communication signals.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An interrogator of a radio frequency identification system comprising:
   a plurality of communication stations individually including:
      a first antenna configured to output a forward link wireless signal;
      a second antenna configured to receive a return link wireless signal responsive to the outputting of the forward link wireless signal and to output a return link communication signal corresponding to the return link wireless signal; and
      a low noise amplifier coupled with the antenna and configured to increase the power of the return link communication signal;
   a plurality of coaxial RF cables coupled with the low noise amplifiers of the respective communication stations and individually configured to communicate the return link communication signal of the respective communication station; and
   a housing remotely located with respect to the communication stations and including:
      a plurality of automatic gain control circuits coupled with respective ones of the coaxial RF cables and configured to adjust at least one electrical characteristic of the respective return link communication signals to output the return link communication signals at a substantially constant level; and
      processing circuitry configured to receive the return link communication signals from the automatic gain control circuits and to process the return link communication signals.

* * * * *

UNITED STATES PATENT AND TRADEMARK OFFICE
CERTIFICATE OF CORRECTION

PATENT NO.   : 6,356,764 B1
DATED        : March 12, 2002
INVENTOR(S)  : David K. Ovard and Roy Greeff It is certified that error appears in the above-identified patent and that said Letters Patent is hereby corrected as shown below:

Column 1,
Line 59, please insert -- located -- after "devices".

Column 3,
Line 14, please delete "081705," and insert -- 08/705, -- after "No.".

Column 9,
Line 12, please insert -- ) -- after "shown".

Column 12,
Line 28, please delete "T" after "137".
Line 35, please delete "A" at the beginning of line 35.

Column 13,
Line 17, please delete "41" after "to".

Signed and Sealed this

Twenty-ninth Day of October, 2002

*Attest:*

JAMES E. ROGAN
Director of the United States Patent and Trademark Office

*Attesting Officer*